US005638590A

United States Patent [19]

Silano

[11] Patent Number: 5,638,590

[45] Date of Patent: Jun. 17, 1997

[54] TOOL FOR SERVICING SUBTERRANEAN GATE VALVES

[76] Inventor: Peter Silano, 18 Pond View Ave., Trumbull, Conn. 06611

[21] Appl. No.: 440,785

[22] Filed: May 15, 1995

[51] Int. Cl.$^{6}$ .................... B23P 19/04

[52] U.S. Cl. .................... 29/254

[58] Field of Search .................... 29/254, 255, 275, 29/270, 264, 213.1; 81/52.3, 52.35; 254/19

[56] References Cited

U.S. PATENT DOCUMENTS

| | | | |
|---|---|---|---|
| 1,873,294 | 8/1932 | Cosgrove | 29/254 |
| 2,641,831 | 6/1953 | Helton | 29/255 |
| 4,573,378 | 3/1986 | McDonald . | |
| 4,582,352 | 4/1986 | Filter et al. . | |
| 4,601,077 | 7/1986 | Doty . | |
| 4,802,391 | 2/1989 | Willhoite et al. . | |
| 5,004,282 | 4/1991 | Perry . | |
| 5,181,303 | 1/1993 | Gregg | 29/255 |
| 5,379,986 | 1/1995 | Perez et al. | 29/254 |
| 5,504,982 | 4/1996 | Sharp | 29/255 |

*Primary Examiner*—Robert C. Watson
*Attorney, Agent, or Firm*—John R. Doherty

[57] ABSTRACT

The invention is directed to a tool for removing and replacing the operating nut on a subterranean gate at the bottom of a valve tile. The tool comprises an elongated shaft having a handle at its upper end and a bifurcated member affixed to its lower end. The bifurcated member is configured to fit easily underneath the operating nut for lifting the nut off of the valve stem. A tubular slide is mounted on the shaft and is adapted to impact against a slide stop located below the handle. A rest is provided on the shaft for holding the tubular slide in spaced apart relation from the slide stop. A nut retaining member is adjustable mounted to the lower end of the shaft for holding a new operating nut on top of the bifurcated member during the replacement operation.

20 Claims, 2 Drawing Sheets

TOOL FOR SERVICING SUBTERRANEAN GATE VALVES

BACKGROUND OF THE INVENTION

1. Field of the Invention

This invention relates to a tool for servicing subterranean gate valves employed in underground utility pipelines. It differs from known valve maintenance tools in that it is designed to remove and replace the operating nut used on certain types of gate values instead of the conventional wheel handle and is characterized mainly by its simplicity, cost effectiveness and reliability.

2. Description of the Prior Art

U.S. Pat. No. 4,573,378 to McDonald discloses a hand tool for removing the wheel handle from a subterranean gate valve. The tool comprises an elongated wrench member including a shaft of sufficient length to reach down through the valve tile to the gate valve at the bottom. The shaft has a handle at its upper end for rotating the shaft and a socket at its lower end adapted to engage the securing nut which holds the wheel handle to the valve stem. A tubular member having an impact surface is movably mounted over the shaft and includes at its lower end a pair of spaced apart vertical arms with offset segments at their ends. The offset segments engage and retain the wheel handle while the shaft is rotated to loosen the securing nut and permit removal of the handle. To assist in such removal, the tubular member is equipped with a slide which can be used as a hammer against the impact surface to provide a vertical force sufficient to loosen the wheel handle if necessary.

U.S. Pat. No. 4,601,077 to Doty discloses a tool for removing dirt and debris from inside the valve tile and for gaining access to a gate valve located at the bottom of the tile. The gate valve is of a different type than that disclosed in the McDonald patent, supra, in that the valve is controlled by a square operating nut placed over the top of the valve stem. The tool includes a handle attached to the upper end of an elongated shaft and a cylindrical part removably affixed to the lower end of the shaft. The cylindrical part has a bore which fits over the operating nut and a helix or auger which surrounds its outer surface. The helix or auger collects and removes the dirt and debris from the valve tile when the handle is rotated. Once the valve tile is cleared, the tool is removed and the cylindrical part is replaced by a square socket which can then be used in a conventional way for turning the operating nut to open and close the gate valve.

The problem with subterranean gate valves of this latter type is that the operating nut, which is usually made of cast iron, corrodes readily over time and looses its shape, that is, the nut becomes more round or less square, so that the nut is no longer useful for turning the square valve stem for operating the valve. In such instances, it may become necessary to excavate the earth around the valve tile to expose the valve and replace the valve operating nut. This can be a time-consuming and costly procedure.

SUMMARY OF THE INVENTION

The invention is directed to a tool for servicing subterranean gate valves and more particularly for removing and replacing the operating nut on such valves without having to excavate or otherwise disturb the environment surrounding the valve. The tool comprises an elongated shaft having a handle at its upper end and a bifurcated member affixed to its lower end. The bifurcated member is configured to fit easily underneath the operating nut for lifting the nut off of the valve stem. A tubular slide is mounted on the shaft and is adapted to impact against a slide stop located below the handle. A rest is provided on the shaft for holding the tubular slide in spaced apart relation from the slide stop. A nut retaining member is adjustably mounted to the lower end of the shaft for holding a new operating nut on top of the bifurcated member during the replacement operation.

DESCRIPTION OF THE PREFERRED EMBODIMENTS

Figure 1:
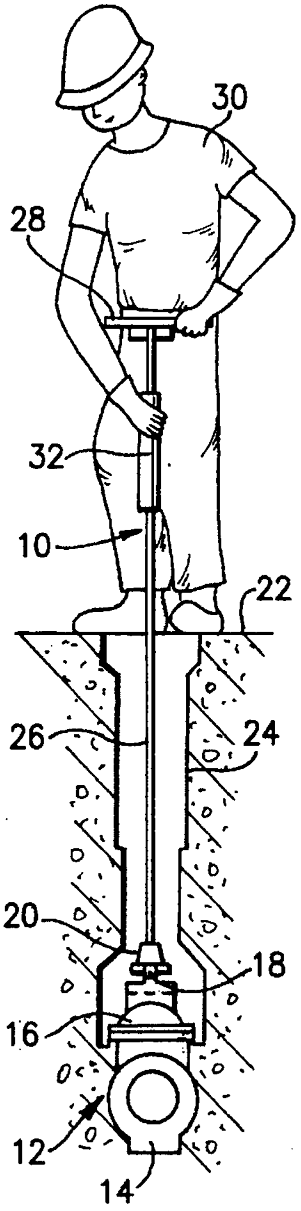
FIG. 1 is a side elevational view of the tool as it appears being placed in an operative position beneath the operating nut of a subterranean gate valve.
Figure 1A:
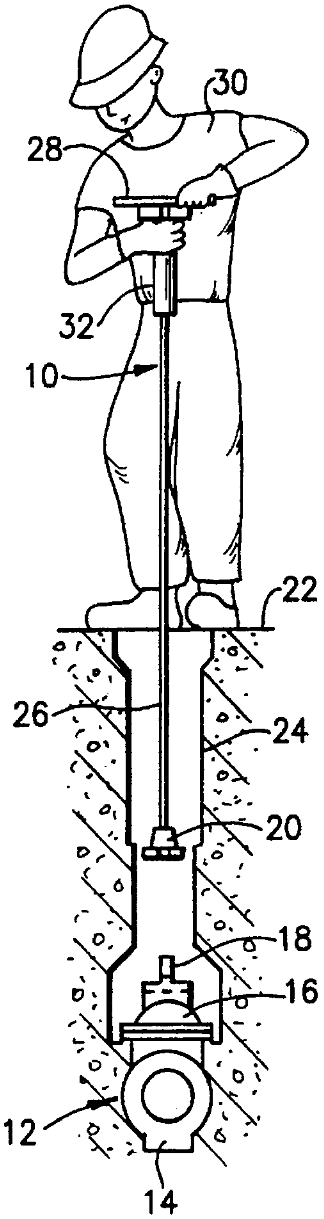
FIG. 1A is a similar view of the tool being lifted upwardly through the valve tile after removal of the operating nut from the valve stem of the gate valve.

Referring now to the drawings in detail, the reference numeral 10 denotes a tool for servicing a subterranean gate valve according to the invention. As shown in FIGS. 1 and 1A, the gate valve 12 includes a valve body 14 and a valve bonnet 16 having a valve stem 18 extending upwardly from the top end thereof. An operating nut 20, usually made of cast iron, for example, is removably mounted on top of the valve stem 18 for opening and closing the gate valve using a conventional socket or wrench. The gate valve 12 is typically connected to a utility pipeline (not shown) buried anywhere from about three to twelve feet below the surface 22 of a roadway or the like. An elongated, tubular valve tile or can 24 extends downwardly from the surface 22 to the gate vale 12 providing access to the operating nut 20 for controlling and servicing the valve. A lid or cover (not shown) is usually placed over the upper end of the valve tile 24 to help keep dirt and debris from entering the tile.

Figure 2:
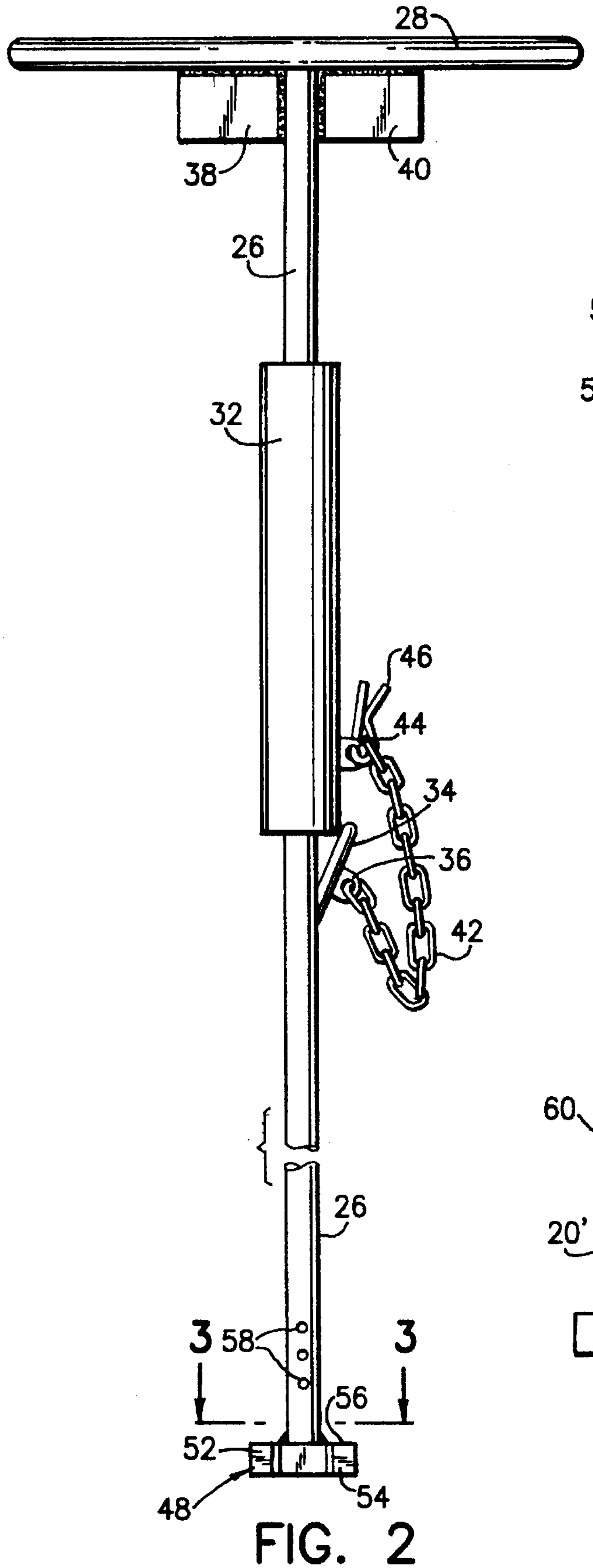
FIG. 2 is an enlarged, broken away, side elevational view of the tool according to the invention.

The tool 10 for removing and replacing the valve operating nut 20 according to the invention is shown in enlarged detail in FIG. 2. As shown, the tool comprises an elongated shaft 26 having a handle 28 secured transversely to the upper end of the shaft such as by welding. Both the shaft 26 and the handle 28 can be made from a one inch diameter steel rod, for example. The shaft 26 should be sufficiently long to extend fully the entire length of the valve tile 24 from approximately the waist height of the operator 30 as shown in FIGS. 1 and 1A.

A tubular slide 32 is mounted loosely around the upper portion of the shaft 26 below the handle 28. A slide rest is provided on the shaft 26 below the slide 32 which may take the form, for example, of a steel pin 34 affixed to and extending from one side of the shaft 26. The pin 34 is preferably welded to the shaft 26 at an acute angle with respect to the longitudinal axis of the shaft and has secured to it an apertured lug 36 for purposes to be made clear hereinafter.

A pair of rigid, metal, rectangular plates 38, 40 are mounted just below or underneath the handle 28, one on each side of the shaft 26. The two plates are preferably welded to both the shaft 26 and the handle 28 and act as a slide stop against the lower edges of which the tubular slide 32 can be impacted to provide an axial, upwardly directed force for loosening the operating nut 20 from the valve stem 18 as shall be later explained in greater detail. The plates 38, 40 should be only slightly wider than about the diameter of the tubular slide 32, for example, leaving enough room for the operator to easily grasp the handle 28 during use of the tool. The plates 38, 40 should also be long enough to protect the operator's hand and fingers from injury when the slide 32 is impacted against the lower edges of the plates, a length of from about four to six inches being suitable, for example.

The tubular slide 32 fits loosely on the shaft 26 and is free to travel from its rest position on the pin 34 upwardly to impact against the lower edges of the stop plates 38, 40. Preferably, the slide 32 should travel a distance of at least about 4 to 6 inches before hitting the plates.

The slide 32 is preferably made of steel and can be of most any size that is easy and comfortable for the operator to grasp, say about 8 to 12 inches long, for example. The thickness of the slide 32 is not critical so long as there is sufficient weight or mass to provide the necessary inertia and axial force to loosen the operating nut 20 upon contact with the plates 38, 40.

A chain 42 is provided for securing the tubular slide 32 to the rest pin 34 when the tool is not in use. The chain 42 is secured to the apertured lug 36 at one end and to another apertured lug 44 affixed to the lower end of the slide 32. The chain 42 is removably attached to the lug 44 via a cotter pin 46. The length of the chain 42 is chosen to limit movement of the slide during non-use and prevent its hitting the plates 38, 40 and causing possible injury to the operator or other person handling the tool.

At the lower end of the shaft 26, there is provided according to the invention a bifurcated member 48 for removing and replacing the valve operating nut 20. Preferably, the bifurcated member 48 is secured to the bottom of the shaft 26 by a strong, permanent weld 50.

Figure 3:
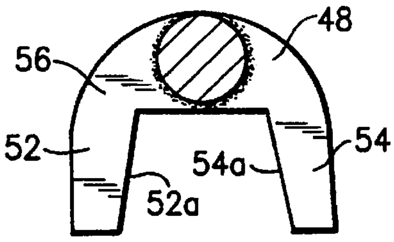
FIG. 3 is an enlarged sectional view taken along the line 3—3 in FIG. 2.
Figure 4:
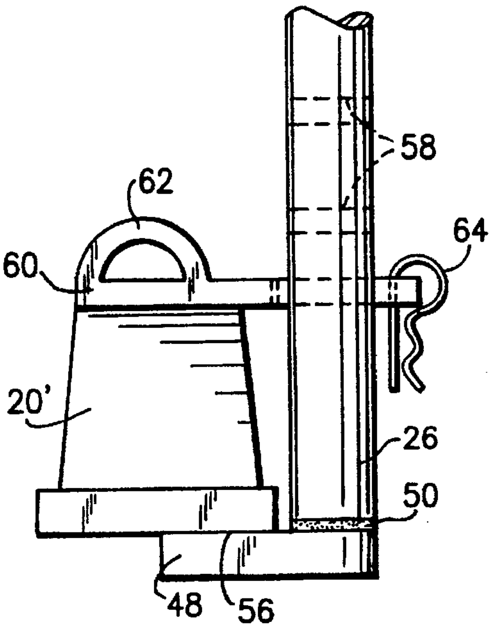
FIG. 4 is an enlarged side elevational view of a portion of the tool shown in FIG. 2 with the replacement nut and retaining member in place at the lower end of the tool.

As shown in FIG. 3, the bifurcated member 48 consists of two elongated prongs 52 and 54 which are configured and adapted to fit underneath the operating nut 20 on the valve stem 18. The prongs 52, 54 are spaced apart a sufficient distance to fit around the valve stem 8 and preferably have their inner edges **52*a* and 54*a* inclined inwardly in a direction toward the shaft 26. This assures that the prongs will easily clear the valve stem 18 and grasp the underneath side of the operating nut 20**.

It is important that the two prongs 52, 54 extend outwardly from the shaft 26 in a direction substantially perpendicular to the handle 28 as shown in FIG. 2. This configuration makes it easier for the operator to guide the bifurcated member 48 underneath the operating nut 20 using the shaft 26 and handle 28 as leverage. It is also important, for reasons to be made clear hereinafter, to position the bifurcated member 48 on the shaft 26 with its top flat surface 56 lying in a plane that is substantially perpendicular or normal to the axis of the shaft.

Spaced from the top surface 56 of the bifurcated member 48 are a series holes 58 which pass through the shaft 26. These holes 58 are positioned at different levels to accommodate a retainer member in the form, for example, of a pin 60 for holding different sizes of operating nuts on top of the flat surface 56 during the replacement procedure as shall be explained. The pin 60 preferably has a semi-circular portion forming an aperture 62 for grasping by the operator and is removably secured in place by a cotter pin 64 passing through a retainer hole on the opposite side of the shaft 26.

To use the tool 10, the operator must first remove the nut retainer pin 60 form the shaft 26 and the chain 42 from the tubular slide 32. The tool is then lowered through the open valve tile 24 to its bottom end with the operator 30 standing over the tile opening as depicted in FIG. 1. The operator then maneuvers the tool 10 to place the bifurcated member 48 underneath the valve operating nut 20 in the manner as described hereinabove. With the two prongs 52, 54 contacting the underside of the operating nut 20, the operator grasps the tubular slide 32 and moves it upwardly along the shaft 26 in a quick, forceful stroke or strokes, hitting the impact plates 38, 40 and applying sufficient axial force against the operating nut 20 to loosen it from around the valve stem 22. The operating nut 22 is then withdrawn from the gate valve while resting on top of the flat surface 56 in the manner as depicted in FIG. 1A. It is, of course, important that the operating nut 20 be kept level on top of flat surface 56 so that it does not fall off the bifurcated member 48 during the removal operation.

Once the valve operating nut 20 has been fully withdrawn, the old operating nut is discarded and a new valve nut 20' is placed on top of the bifurcated member 48. The new valve nut 20' is held in place by inserting the retaining pin 60 in an appropriate one of the holes 58, depending on the size of the nut, and by securing the retainer using the cotter pin 64. The tool is then lowered again through the valve tile 24 and the new nut 20' is carefully placed over the top of the valve stem 18. The tool 10 is then raised again out of the valve tile, leaving the new operating nut 20' in place on the valve stem 18 for controlling the valve.

The tool of the invention is simple to construct, easy to use and economical to manufacture. While it may typically require thousands of dollars in man hours of work and equipment to excavate a subterranean gate valve and replace its operating nut, the same procedure can be accomplished for a mere fraction of the cost using the instant valve servicing tool.

Figure 5:
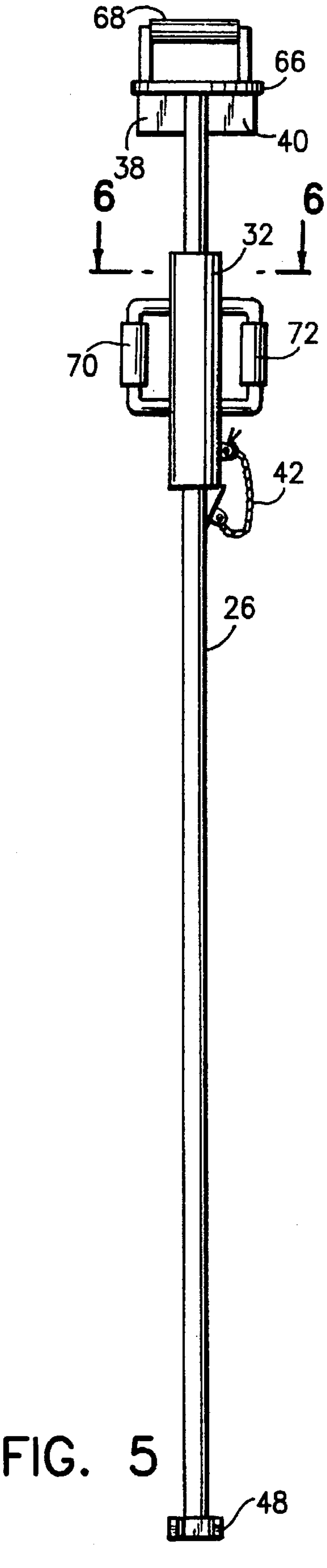
FIG. 5 is a side elevational view of a modified tool according to the invention.

FIG. 5 shows a modification of the tool 10 which incorporates certain improved features. Thus, as shown, the handle 28 can be replaced by a guard plate 66 and a smaller raised or inverted handle 68. This configuration adds further protection against injury to the operator's hands and fingers. Similarly, a pair of raised handles 70, 72 may be affixed to opposite sides of the tubular slide 32 for ease in grasping the slide and stroking it against the impact plates 38, 40.

Figure 6:
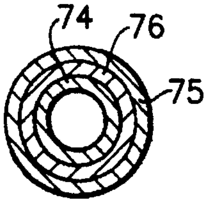
FIG. 6 is a sectional view taken along the line 6—6 in FIG. 5.

As shown in FIG. 6, the tubular slide 32 may be composed of two pipes 74 and 75 with an inner layer 76 of white lead for added weight.

Other features and modifications of the tool of the invention are possible without departing from the spirit and scope of the invention. For example, it is possible to employ other types of retainer members for holding the operating nut on the bifurcated member such as a removable clamp fitted around the shaft 26 at variable distances above the top surface 56. This easily accommodates nuts of many different sizes.

What is claimed is:

1. A tool for removing and replacing the operating nut on the valve stem of a subterranean gate valve located at the bottom of a valve tile, said tool comprising, in combination:

an elongated shaft having an upper and a lower end;

means for holding said shaft at said upper end thereof;

an impact member attached to said shaft, said impact member having an impact surface spaced from said holding means;

a bifurcated member attached to said lower end of said shaft and adapted to fit underneath said operating nut and around said valve stem;

a tubular slide loosely mounted on said shaft below said impact surface and adapted to impact against said surface producing an upwardly directed axial force along said shaft for removing said operating nut from said valve stem; and means for retaining a new operating nut on top of said bifurcated member and for placing said new nut on said valve stem.

2. A tool according to claim 1, wherein said nut retaining means includes a pin secured to said shaft in spaced apart relation from said bifurcated member, said pin contacting said nut and holding it against said bifurcated member.

3. A tool according to claim 2, wherein said retainer pin passes through a hole near the lower end of said shaft and is secured in said hole by a cotter pin.

4. A tool according to claim 3, wherein a plurality of holes are provided in said shaft at different spaced apart levels above said bifurcated member.

5. A tool according to claim 1, wherein said bifurcated member comprises a pair of spaced apart prongs whose inner edges are inclined inwardly toward said shaft to facilitate fitting beneath said operating nut and around said valve stem.

6. A tool according to claim 1, wherein said means for holding said shaft comprises an inverted handle mounted on a plate attached to said upper end of said shaft.

7. A tool according to claim 1, wherein said tubular slide is provided with at least one handle attached thereto.

8. A tool for removing and replacing the operating nut on the valve stem of a subterranean gate valve located at the bottom of a valve tile, said tool comprising, in combination:

an elongated shaft having an upper and a lower end;

means for holding said shaft at said upper end thereof;

an impact member attached to said shaft, said impact member having an impact surface spaced from said holding means;

a bifurcated member attached to said lower end of said shaft and adapted to fit underneath said operating nut and around said valve stem;

a tubular slide loosely mounted on said shaft below said impact surface and adapted to impact against said surface producing an upwardly directed axial force along said shaft for removing said operating nut from said valve stem; and a pin secured to said shaft below said tubular slide at an upwardly inclined acute angle with respect to the longitudinal axis of said shaft, said pin providing a rest stop for holding said slide in spaced apart relation from said impact surface.

9. A tool for removing and replacing the operating nut on the valve stem of a subterranean gate valve located at the bottom of a valve tile, said tool comprising, in combination:

an elongated shaft having an upper and a lower end;

means for holding said shaft at said upper end thereof;

an impact member attached to said shaft, said impact member having an impact surface spaced from said holding means;

a bifurcated member attached to said lower end of said shaft and adapted to fit underneath said operating nut and around said valve stem;

a tubular slide loosely mounted on said shaft below said impact surface and adapted to impact against said surface producing an upwardly directed axial force along said shaft for removing said operating nut from said valve stem;

a rest stop provided on said shaft below said tubular slide for holding said slide in spaced apart relation from said impact surface; and means for securing said tubular slide against movement toward and impact with said impact surface during periods of nonuse.

10. A tool according to claim 9, wherein said securing means is a chain removably attached to said shaft and said tubular slide.

11. A tool for removing and replacing the operating nut on the valve stem of a subterranean gate valve located at the bottom of a valve tile, said tool comprising, in combination:

an elongated shaft having an upper and a lower end;

a handle mounted transversely across said shaft at said upper end thereof for holding said shaft;

an impact member attached to said shaft, said impact member including at least one rigid plate mounted below said handle and secured to said shaft, the lower edges of said plate comprising an impact surface spaced from said handle;

a bifurcated member attached to said lower end of said shaft and adapted to fit underneath said operating nut and around said valve stem; and a tubular slide loosely mounted on said shaft below said impact surface and adapted to impact against said surface producing an upwardly directed axial force along said shaft for removing said operating nut from said valve stem.

12. A tool according to claim 11, wherein said bifurcated member comprises a pair of spaced apart prongs whose inner edges are inclined inwardly toward said shaft to facilitate fitting beneath said operating nut and around said valve stem.

13. A tool according to claim 11, wherein said handle comprises an inverted handle mounted on a plate attached to said upper end of said shaft.

14. A tool according to claim 11, wherein said tubular slide is provided with at least one handle attached thereto.

15. A tool for removing and replacing the operating nut on the valve stem of a subterranean gate valve located at the bottom of a valve tile, said tool comprising, in combination:

an elongated shaft having an upper and a lower end;

a handle mounted to said upper end of said shaft;

an impact member attached to said shaft below said handle, said impact member having an impact surface spaced from said handle;

a bifurcated member attached to said lower end of said shaft, said bifurcated member comprising a pair of spaced apart prongs whose inner edges are inclined inwardly toward said shaft to facilitate fitting beneath said operating nut and around said valve stem;

a tubular slide loosely mounted on said shaft below said impact surface and adapted to impact against said surface producing an upwardly directed axial force along said shaft for removing said operating nut from said valve stem;

a rest stop provided on said shaft below said tubular slide for holding said slide in spaced apart relation from said impact surface;

means for securing said tubular slide against movement toward and impact with said impact surface during periods of nonuse; and means for retaining a new operating nut on top of said bifurcated member and for placing said new nut on said valve stem.

16. A tool according to claim 15, wherein said securing means is a chain removably attached to said shaft and said tubular slide.

17. A tool according to claim 15, wherein said nut retaining means includes a pin secured to said shaft in spaced apart relation from said bifurcated member, said pin contacting said nut and holding it against said bifurcated member.

18. A tool according to claim 17, wherein said retainer pin passes through a hole near the lower end of said shaft and is secured in said hole by a cotter pin.

19. A tool according to claim 18, wherein a plurality of holes are provided in said shaft at different spaced apart levels above said bifurcated member.

20. A tool according to claim 17, wherein said tubular slide is composed of inner and an outer pipes with a middle layer of white lead for added weight.

* * * * *